(12) United States Patent
Immonen et al.

(10) Patent No.: US 8,611,888 B2
(45) Date of Patent: Dec. 17, 2013

(54) POWER RESTRICTION CONTROL FOR INTER-BAND MULTI-CARRIER CAPABLE DEVICES

(75) Inventors: Antti Oskari Immonen, Helsinki (FI); Seppo Rousu, Oulu (FI); Jouni Kristian Kaukovuori, Vantaa (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/372,574

(22) Filed: Feb. 14, 2012

(65) Prior Publication Data

US 2013/0196648 A1   Aug. 1, 2013

(30) Foreign Application Priority Data

Jan. 27, 2012 (GB) .................................. 1201430.4

(51) Int. Cl.
*H04W 4/00* (2009.01)
(52) U.S. Cl.
USPC ...................................................... 455/422.1
(58) Field of Classification Search
USPC ............. 455/522, 414.1, 127.1, 114.3, 226.1, 455/63.1, 127.2, 194.2, 436, 442, 570, 455/13.4; 330/149, 10; 375/148, 227, 340, 375/240.03, 296; 704/225
See application file for complete search history.

(56) References Cited

U.S. PATENT DOCUMENTS

| | | | | |
|---|---|---|---|---|
| 5,848,106 A * | 12/1998 | Khayrallah | .................... | 375/340 |
| 8,295,335 B2 * | 10/2012 | Yang | .............................. | 375/219 |
| 2002/0193115 A1 * | 12/2002 | Furukawa et al. | ............ | 455/442 |
| 2004/0032296 A1 * | 2/2004 | Akaiwa | ......................... | 330/149 |
| 2005/0009553 A1 | 1/2005 | Cho | .................... | 455/522 |
| 2008/0039045 A1 | 2/2008 | Filipovic et al. | .............. | 455/295 |
| 2012/0289278 A1 * | 11/2012 | Huschke et al. | .............. | 455/522 |

FOREIGN PATENT DOCUMENTS

EP  1143751 A1  10/2001

OTHER PUBLICATIONS

3GPP TS 36.104 V10.5.0 (Dec. 2011), "$3^{rd}$ Generation Partnership Project; Technical specification Group Radio Access network; Evolved Universal Terrestrial Radio Access (E-UTRA); Base Station (BS) Radio Transmission and Reception (Release 10)", Table 5.5-1, 3 pgs.
EP Search Report for corresponding GB Patent Application No. 1201430.4 mailed Jun. 21, 2012.

* cited by examiner

*Primary Examiner* — Kiet Doan
(74) *Attorney, Agent, or Firm* — Stanton IP Law

(57) ABSTRACT

There are provided measures for enabling power restriction control for inter-band multi-carrier capable devices, such as e.g. inter-band carrier aggregation capable devices. Such measures may exemplarily include a distortion level determination on a downlink band of a terminal device when using at least one output power restriction value for output power for at least one uplink band of the terminal device, and a power restriction control with respect to the at least one output power restriction value on the basis of the determined distortion level and a preconfigured distortion threshold condition.

17 Claims, 8 Drawing Sheets

POWER RESTRICTION CONTROL FOR INTER-BAND MULTI-CARRIER CAPABLE DEVICES

FIELD OF THE INVENTION

The present invention relates to power restriction control for inter-band multi-carrier capable devices. More specifically, the present invention relates to measures (including methods, apparatuses and computer program products) for enabling power restriction control for inter-band multi-carrier capable devices, such as e.g. inter-band carrier aggregation capable devices.

BACKGROUND

In modern and future (cellular) communication systems, an inter-band multi-carrier capability of devices such as terminal devices is gaining more attention and importance.

For example, in 3GPP systems, inter-band carrier aggregation represents an inter-band multi-carrier communication framework which shall be supported by devices such as terminal devices. In inter-band carrier aggregation, at least two carriers operating on different (frequency) bands are aggregated together in/for at least one of downlink and uplink.

When multiple carriers operating on different (frequency) bands are combined or aggregated, such as in inter-band carrier aggregation, intermodulation distortion (IMD) is typically produced due to nonlinearity in active and/or passive components of a device transmitter (in case of uplink transmission), a device receiver (in case of downlink transmission) or a device transceiver (in both cases). Generally, intermodulation distortion components of (m+n)-th order are located at frequencies $m*f_1 \pm n*f_2$. For instance, assuming that uplink carriers/bands at frequencies $f_{UL1}$ and $f_{UL2}$ are combined or aggregated, a second order intermodulation distortion component is located at one of frequencies $2*f_{UL1}$, $2*f_{UL2}$, and $f_{UL1} \pm f_{UL2}$, and a third order intermodulation component is located at one of frequencies $3*f_{UL1}$, $3*f_{UL2}$, $2*f_{UL1} \pm f_{UL2}$, $f_{UL1} \pm 2*f_{UL2}$, and so on. Further, harmonic distortion is also produced, which is located at a frequency $x*f_{UL}$ for xt-th order harmonics of an uplink carrier/band at frequency $f_{UL}$.

When at least one (or part) of such intermodulation distortion components and/or at least one (or part) of such harmonic distortion components falls in a (frequency) band being used for some transmission operation by the device in question, e.g. a DL carrier/band, such distortion can cause a significant amount of desensitization. Such desensitization is specifically applicable for certain (inter-band) combinations of standardized carriers/bands depending on one or more of the frequency relations between uplink and downlink channel definitions, antenna operational conditions and antenna isolations.

Namely, for certain frequency relations between uplink and downlink channel definitions, (part of) intermodulation distortion components of uplink carrier/band combinations and/or (or part) of harmonic distortion components of uplink carriers/bands hit on top of a downlink carrier/band and thus destroy the performance thereof, if no additional power restrictions are in place. Referring to 3GPP uplink and downlink channel definitions according to 3GPP TS 36.104 (Table 5.5-1), for example, aggregating bands (i.e. aggregating component carriers operating on bands) B20 and B8 causes a third order intermodulation distortion component from B20 UL (832-862 MHz) and B8 UL (880-915 MHz) to overlap with B8 DL (925-960 MHz). As another example, a third order harmonic distortion of B17 UL (704-716 MHz) overlaps with B4 DL (2110-2155 MHz).

Furthermore, (part of) intermodulation distortion components and/or (or part) of harmonic distortion components can also hit on top of some non-3GPP Radio Access Technology (RAT), for instance in the 2.4 GHz frequency band (ISM band) used e.g. by WLAN and Bluetooth. For instance, this is the case for the second order intermodulation distortion component when aggregating bands B4 and B12.

The distortion problem as outlined above, i.e. an excessive desensitization of some operating band/carrier (e.g. a DL carrier in case of a multi-band UL carrier combination and/or UL band harmonic), can be avoided if the distortion power of a distortion component is sufficiently low as compared with the actual transmission power of that operating band/carrier. For instance, under current assumptions, desensitization could be considered to be not significant when being smaller than 0.5 dB.

In order to ensure an acceptable level of desensitization, power restriction values are adopted, which define relaxation to maximum output power of one or more UL bands of a terminal device. As such output power relaxation adversely affects the coverage of the terminal device, the power restriction values are to be specified in view of a tradeoff between DL distortion or desensitization and device UL coverage.

In 3GPP standardization, power restriction values are defined under rather pessimistic assumptions in terms of reference architecture and values for component performance so as to reliably ensure that real implementations based on such values are practicable, while still meeting requirements for desensitization (e.g. a maximum allowable desensitization of 0.5 dB). Accordingly, such standardized power restriction values are not very strict, and deviate from achievable implementations (which could meet required desensitization performance with lower power restrictions).

That is to say, for the benefit of meeting desensitization requirements, standardized power restriction values excessively restrict device UL coverage, thus taking a loss in suboptimal device UL coverage. However, there are currently no means for reliably and efficiently ensuring an appropriate tradeoff between DL distortion or desensitization and device UL coverage in view of standardized power restriction values.

Thus, there is a desire to provide for power restriction control for inter-band multi-carrier capable devices. More specifically, is a desire to provide for power restriction control for inter-band multi-carrier capable devices in terms of a tradeoff between distortion or desensitization and device coverage, e.g. in the context of inter-band carrier aggregation.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising determining a distortion level on a downlink band of a terminal device when using at least one output power restriction value for output power for at least one uplink band of the terminal device, and performing power restriction control with respect to the at least one output power restriction value on the basis of the determined distortion level and a preconfigured distortion threshold condition.

According to an exemplary aspect of the present invention, there is provided an apparatus (which may e.g. be arranged/configured for use on a terminal side of a cellular system), comprising at least one processor, at least one memory including computer program code, and at least one interface configured for communication with at least another apparatus, the at least one processor, with the at least one memory and the computer program code, being arranged/configured to cause the apparatus to perform: determining a distortion level on a downlink band of a terminal device when using at least one output power restriction value for output power for at least one uplink band of the terminal device, and performing power restriction control with respect to the at least one output power restriction value on the basis of the determined distortion level and a preconfigured distortion threshold condition.

According to an exemplary aspect of the present invention, there is provided a computer program product comprising computer-executable computer program code which, when the program is run on a computer (e.g. a computer of an apparatus according to the aforementioned apparatus-related exemplary aspect of the present invention), is configured to cause the computer to carry out the method according to the aforementioned method-related exemplary aspect of the present invention.

Such computer program product may comprise or be embodied as a (tangible) computer-readable (storage) medium or the like on which the computer-executable computer program code is stored, and/or the program may be directly loadable into an internal memory of the computer or a processor thereof.

Advantageous further developments or modifications of the aforementioned exemplary aspects of the present invention are set out in the following.

By virtue of any one of the aforementioned exemplary aspects of the present invention, a power restriction control for inter-band multi-carrier capable devices is achievable, which is effective in terms of a tradeoff between distortion or desensitization and device coverage, e.g. in the context of inter-band carrier aggregation. Namely, a power restriction control according to the aforementioned exemplary aspects of the present invention enables meeting desensitization requirements with enhanced device coverage. Such power restriction control according to the aforementioned exemplary aspects of the present invention is flexible, dynamic and device-specific, and it may thus compensate e.g. for device implementation dependent variations or the like.

By way of exemplary embodiments of the present invention, there is provided a power restriction control for inter-band multi-carrier capable devices. More specifically, by way of exemplary embodiments of the present invention, there are provided measures and mechanisms for enabling a power restriction control for inter-band multi-carrier capable devices (in/for cellular communication systems), such as e.g. inter-band carrier aggregation capable devices.

Thus, enhancements are achieved by methods, apparatuses and computer program products enabling a power restriction control for inter-band multi-carrier capable devices.

BRIEF DESCRIPTION OF DRAWINGS

For a more complete understanding of exemplary embodiments of the present invention, reference is now made to the following description taken in connection with the accompanying drawings in which.

DESCRIPTION OF EXEMPLARY EMBODIMENTS

Figure 1:
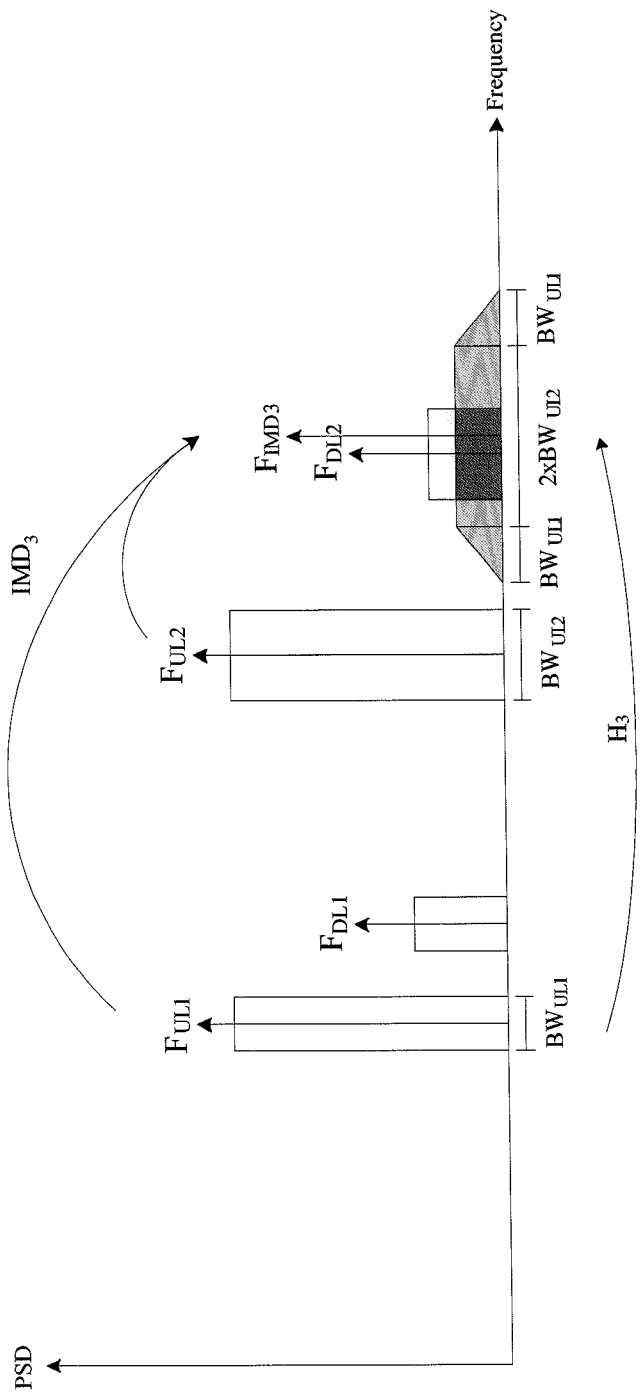
FIG. 1 shows a diagram of an example of third order intermodulation distortion and/or third order harmonic distortion on a downlink band, for which exemplary embodiments of the present invention are applicable.

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, the present invention and its embodiments may be applicable in any (cellular) communication system and/or network deployment operable with inter-band multi-carrier capable devices, e.g. in any (cellular) communication system and/or network deployment supporting inter-band carrier aggregation or the like.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms, measures and means for enabling power restriction control for inter-band multi-carrier capable devices.

In the following, exemplary embodiments of the present invention are described with reference to methods, procedures and functions, as well as with reference to structural arrangements and configurations.

More specifically, without restricting generality, the present invention and exemplary embodiments thereof are described with reference to a 3GPP-based LTE communication system and inter-band carrier aggregation therein.

As used herein, any references to aggregation or combination of bands (in the context of carrier aggregation) encompasses or corresponds to aggregation or combination of component carriers operating on respective bands.

FIG. 1 shows a diagram of an example of third order intermodulation distortion and/or third order harmonic distortion on a downlink band, for which exemplary embodiments of the present invention are applicable. In FIG. 1, the power spectral density is plotted over the frequency. Regarding FIG. 1, it is noted that only third order intermodulation distortion and third order harmonic distortion are illustrated as a non-limiting example of distortion/interference sources. Nonetheless, other distortion/interference sources are equally applicable in the context of exemplary embodiments of the present invention. For example, at least in some operational cases, adjacent channel powers (according to ACLR) of fundamental carrier powers and/or adjacent channel powers (according to ACLR) of harmonic carrier powers and/or intermodulation distortion results of ACLR may also be applicable and, thus, may be taken into account. In FIG. 1, such other conceivable distortion/interference sources are not illustrated for the sake of clarity only.

Basically, FIG. 1 illustrates examples of potential desensitization due to intermodulation distortion and/or harmonic distortion, as outlined above. Accordingly, the downlink carrier of a second band suffers from desensitization due a third order intermodulation distortion of a band combination of first and second bands and/or a third order harmonic distortion of a first band. The second band, i.e. the DL band of the second band, may thus be referred to as a victim band.

Figure 2:
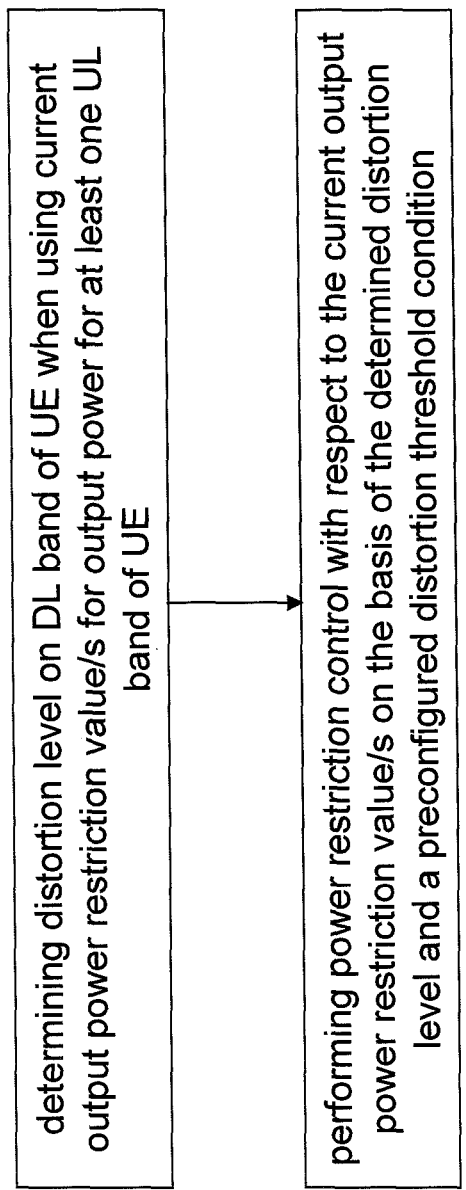
FIG. 2 shows a flowchart of a first variant of an exemplary method according to exemplary embodiments of the present invention.

FIG. 2 shows a flowchart of a first variant of an exemplary method according to exemplary embodiments of the present invention.

The method according to FIG. 2 is operable at a device/terminal, i.e. at a device or terminal such as a UE, and comprises an operation of determining a distortion level on a downlink band of a terminal device when using at least one output power restriction value for output power for at least one uplink band of the terminal device, and an operation of performing power restriction control with respect to the at least one output power restriction value on the basis of the determined distortion level and a preconfigured distortion threshold condition.

According to exemplary embodiments of the present invention, the at least one output power restriction value may comprise at least one band-specific output power restriction value for an output power for one uplink band of the terminal device and/or at least one combination-specific output power restriction value for a cumulative output power for a combination of at least two uplink bands of the terminal device. Namely, the determination and power restriction control operations according to exemplary embodiments of the present invention may for example be based on a band-specific A-MPR value which is applicable for a single one of uplink bands of the terminal device, respectively. Also, the determination and power restriction control operations according to exemplary embodiments of the present invention may for example be based on a combination-specific value which is applicable for an uplink band combination/aggregation of the terminal device, respectively.

In an exemplary scenario, a method according to exemplary embodiments of the present invention may use determination (e.g. measurement) results of a victim band receiver as a trigger to tune A-MPR values (i.e. output power restriction). In case e.g. a measured sensitivity of the victim band is good, meaning desensitization is well below a standard-specified value or device-specific value, the A-MPR e.g. given by 3GPP specifications can be changed into a lower value. The determination (e.g. measurement) is looped so that e.g. sensitivity measured and desensitization is deduced again with the new A-MPR value. In case desensitization is still at low levels, the A-MPR can be further reduced (and thereby UE coverage increased), or in case desensitization rises, then the A-MPR shall not to be further reduced or is increased back to an earlier value. In case desensitization is at a desired level, the optimal A-MPR is found and taken as a final value.

According to exemplary embodiments of the present invention, the method may be performed in a continuous way or upon demand or (internal/external) request. For example, the method may be performed when a new output power restriction value is given by the network or an operator or user, before a UL/DL transmission is scheduled, or the like.

Generally, a method according to exemplary embodiments of the present invention may be applied in a testing phase of the terminal device or its platform and/or an operation phase of the terminal device (i.e. in the field). It is to be noted that application in a testing phase is more secure in terms of compliance with regulatory requirements or emission limits, while application in an operation phase (i.e. in the field) might be problematic in terms of potential non-compliance with regulatory requirements or emission limits.

In a testing phase of the terminal device or its platform (i.e. in reference platform testing or UE testing), an initial value (starting value) of the output power restriction value may be based on an initial guess. In such use case, the determination and power restriction control operations may be performed for a plurality of uplink-downlink band allocations of the terminal device, and a smallest one of resulting output power restriction values for the plurality of uplink-downlink band allocations of the terminal device may be adopted as a result of the power restriction control.

Namely, in a testing phase, a determination/control sweep at different UL/DL allocations may be performed with a single victim DL band. Thereby, it may be ensured that the power restriction control, i.e. the resulting final output power restriction value, even satisfies a worst case scenario (i.e. distortion is on top of own DL of the UE), thus guaranteeing that the resulting final output power restriction value meets a desensitization target also in cases where the (worst) distortion directly hits on top of DL.

In an operational phase of the terminal device (i.e. in the field), an initial value (stating value) of the output power restriction value may be based on a network signaling or a preconfiguration. In such use case, the determination and power restriction control operations may be performed for a currently assigned uplink-downlink band allocation of the terminal device.

Such network signaling or preconfiguration according to exemplary embodiments of the present invention may for example comprise one more of the following variants.

In terms of a band-specific output power restriction value, a configuration could for example be in the form of:
$A\text{-}MPR_A$ dB for band A (e.g. A=9 dB)
$A\text{-}MPR_B$ dB for band B (e.g. B=9 dB)

a fixed restriction for band A, e.g. +20 dBm a fixed restriction for band B, e.g. +20 dBm In terms of a combination-specific output power restriction value C, a configuration could for example be in the form of:

C for IMD2, and/or

C for IMD3, and/or

C for harmonic distortion of band X, etc.

In terms of a combination-specific output power restriction value C, a configuration could for example also be in the form of:

C for IMD2, and/or

C for IMD3, and/or

C for harmonic distortion of band X, etc., and a fixed restriction (i.e. a maximum allowable output power value) per band, e.g. +20 dBm.

In terms of a combination-specific output power restriction value C, a configuration could for example also be in the form of:

C for IMD2, and/or

C for IMD3, and/or

C for harmonic distortion of band X, etc., and

NS_xy (giving e.g. A-MPR$_A$) dB for band A,

NS_yx (giving e.g. A-MPR$_B$) dB for band B, and a fixed restriction (i.e. a maximum allowable output power value) per band, e.g. +20 dBm.

The aforementioned values NS_xy and NS_yx are band-specific network signaling values (giving band-specific output power restriction values such as e.g. A-MPR), which may be given in addition to a combination-specific output power restriction value C. It is noted that xy and yx in NS_xy and NS_yx constitute placeholders which may represent any number, e.g. NS_01, NS_02, and so on. That is to say, corresponding information according to exemplary embodiments of the present invention may be signaled in any (specified) network signaling (NS) value.

The aforementioned NS values are not output power reduction values themselves, but contain a table of output power reduction values which depend on different conditions (number of RBs, CC placement etc.). Therefore, the amount of e.g. A-MPR can vary from 0 to 12 dB within. NS_xy or NS_yx, for example.

Namely, in an operational phase, a determination/control may be adaptive depending on the current DL frequency assignment. In case DL frequency is such that distortion does not hit on top of it, then power restriction control (i.e. application of an output power restriction value) might not be needed at all. In case DL frequency is such that distortion hits partly on top of it, then power restriction control (i.e. application of an output power restriction value) is probably needed. In case DL frequency is such that distortion hits totally on top of it, then power restriction control (i.e. application of an output power restriction value) is needed.

Generally, components of distortion results may be at least one or more of UL fundamental power, UL ACLR power, UL harmonic power, UL harmonic ACLR power, intermodulation, and so on. Interfering radio/radios may be own communication link radio and/or alternate (=another device's) communication link radio.

Figure 3:
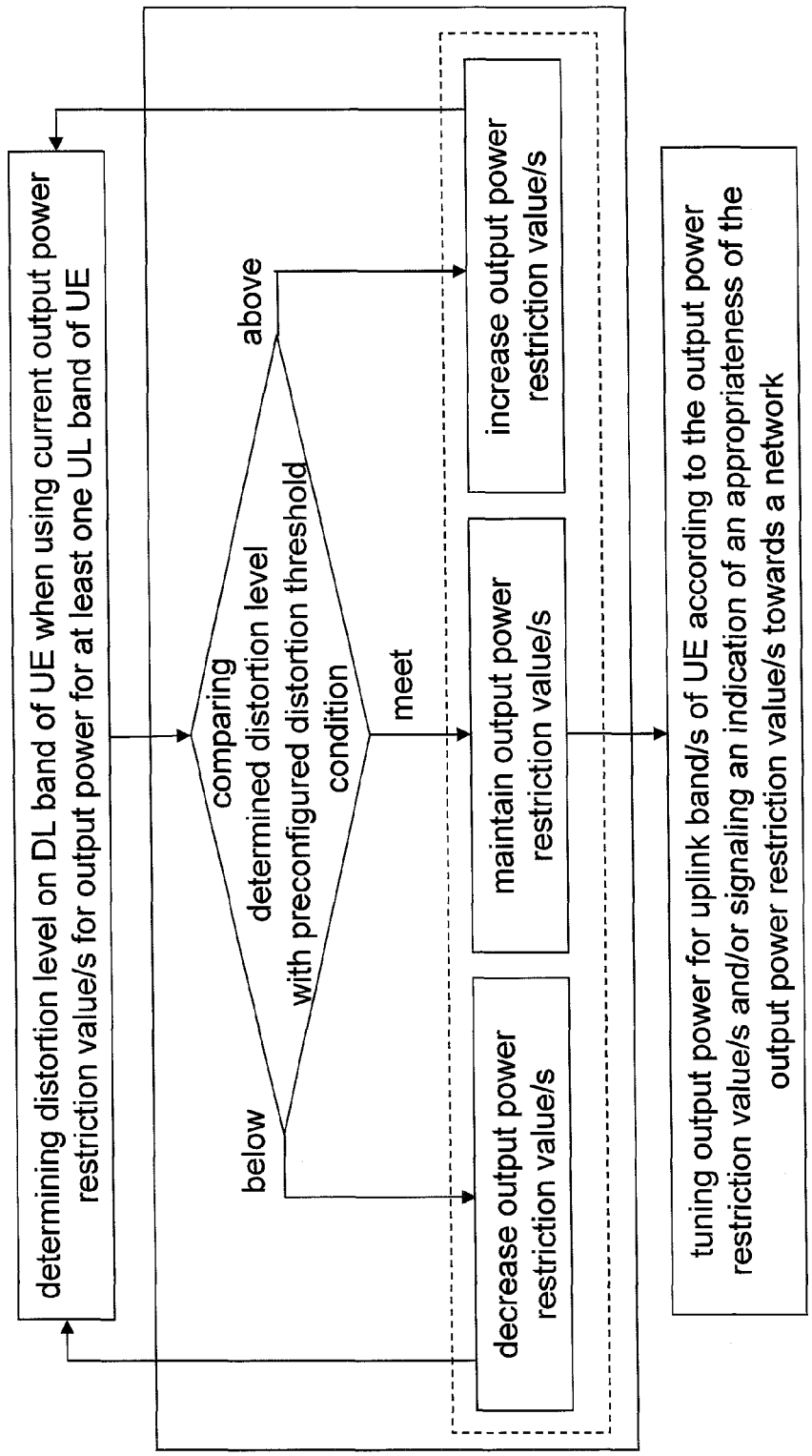
FIG. 3 shows a flowchart of a second variant of an exemplary method according to exemplary embodiments of the present invention.

FIG. 3 shows a flowchart of a second variant of an exemplary method according to exemplary embodiments of the present invention.

The method according to FIG. 3 represents a variation of the method according to FIG. 2, in which exemplary details of the power restriction control operation and an exemplary additional operation are given, which are inherently independent from each other as such.

According to FIG. 3, an exemplary power restriction control operation according to exemplary embodiments of the present invention may comprise an operation of comparing the determined distortion level with the preconfigured distortion threshold condition, and an operation of controlling the at least one output power restriction value based on the comparison result (said control operation being indicated by a dashed block).

In terms of the comparison operation, the preconfigured distortion threshold condition may comprise a device-specific distortion threshold condition, such as a condition being specified by a device manufacturer e.g. as the result of reference platform and/or device testing, or a standard distortion threshold condition, such as a condition being specified by 3GPP standardization. Further, preconfigured distortion threshold conditions may contain device-specific antenna isolations in different operational cases and/or use cases, which may be altered e.g. by one or more of mechanical dimensions of a product, a hinge state (i.e. a hinge being open/closed), a slide state (i.e. a slide being open/closed), a clamshell state (i.e. a clamshell being open/closed), operational frequencies, operational antennas, alternate antennas in operation, and the like.

The preconfigured distortion threshold condition may comprise a distortion threshold level, which may be defined by a single distortion threshold value. In this case, the comparison operation may yield that the determined distortion level is equal to the distortion threshold value (i.e. meets the preconfigured distortion threshold condition), is smaller than the distortion threshold value (i.e. below the preconfigured distortion threshold condition), or is larger than the distortion threshold value (i.e. above the preconfigured distortion threshold condition). The distortion threshold value may for example be a maximum allowable desensitization (e.g. 0.5 dB), which may for example be specified by 3GPP standardization.

The preconfigured distortion threshold condition may comprise a distortion threshold range, which may be defined by a tolerance range at/around a single distortion threshold value or a pair of upper and lower distortion threshold values. In this case, the comparison operation may yield that the determined distortion level is equal to or around the distortion threshold value or between the upper and lower distortion threshold values (i.e. meets the preconfigured distortion threshold condition), is well smaller than the distortion threshold value (by the distortion threshold range) or the lower distortion threshold value (i.e. below the preconfigured distortion threshold condition), or is well larger than the distortion threshold value (by the distortion threshold range) or the upper distortion threshold value (i.e. above the preconfigured distortion threshold condition). The distortion threshold range may for example be such that a tolerance range or margin of e.g. ±10% of a maximum allowable desensitization (e.g. 0.5 dB), which may for example be specified by 3GPP standardization, is defined for meeting the preconfigured distortion threshold condition.

In terms of the control operation, an output power restriction value may be decreased when the determined distortion level is below the preconfigured distortion threshold condition, may be increased when the determined distortion level is above the preconfigured distortion threshold condition, or may be maintained, when the determined distortion level meets the preconfigured distortion threshold condition.

According to exemplary embodiments of the present invention, the output power restriction value may be decreased by a specified or adjustable decrease amount (i.e. down step size), and/or the output power restriction value may be increased by a specified or adjustable decrease amount (i.e. up step size) or to a previously valid output power restriction value. The decrease amount and/or the increase amount may be static, semi-static or flexible. For example, the decrease amount and/or the increase amount may be adjusted according to a difference between the determined distortion level and the (upper/lower) distortion threshold value such that the decrease/increase amount is the larger the larger the difference is.

According to exemplary embodiments of the present invention, after the aforementioned control operation, the output power restriction value may be adopted as a final output power restriction value, when it is controlled to be maintained in the recent control operation. The final output power restriction value may be used for power control, e.g. power control loops at the terminal device may be carried out (or changed) using the final output power restriction value. As shown in FIG. 3, the final output power restriction value may be utilized to tune the output power for the at least one uplink band of the terminal device (e.g. a single UL band in case of a band-specific output power restriction value and/or an UL band combination/aggregation in case of a combination-specific output power restriction value) accordingly. Additionally or alternatively, as shown in FIG. 3, the final output power restriction value may be utilized to (explicitly or implicitly) signal an indication of an appropriateness of the final output power restriction value towards a network and/or another terminal device. In case of such signaling (which indicates that the terminal device can also use lower output power restriction values), the network and/or the other terminal device can decide whether it (correspondingly) adjusts and uses and/or signals lower output power restriction values or not.

Such explicit or implicit signaling of an indication could be accomplished in several ways. For example, the UE may signal the indication in an explicit action. Further, for example, the UE may not signal anything (in an explicit way), but may proceed to use a transmission mode or reporting which only applies for a configuration that is not what the network requested. Still further, for example, the UE may comply with the network directives, but may proceed to use such values (e.g. CQI, SRS) for reporting, which force the network to deduce that its configuration does not work (e.g. UE transmits UL SRS with such a low power that eNB cannot detect it, leading the eNB to conclude that the UL is useless).

According to exemplary embodiments of the present invention, the method may loop back to the determination operation using the decreased/increased output power restriction value, when the output power restriction value is controlled to be decreased or increased in the recent control operation.

Figure 4:
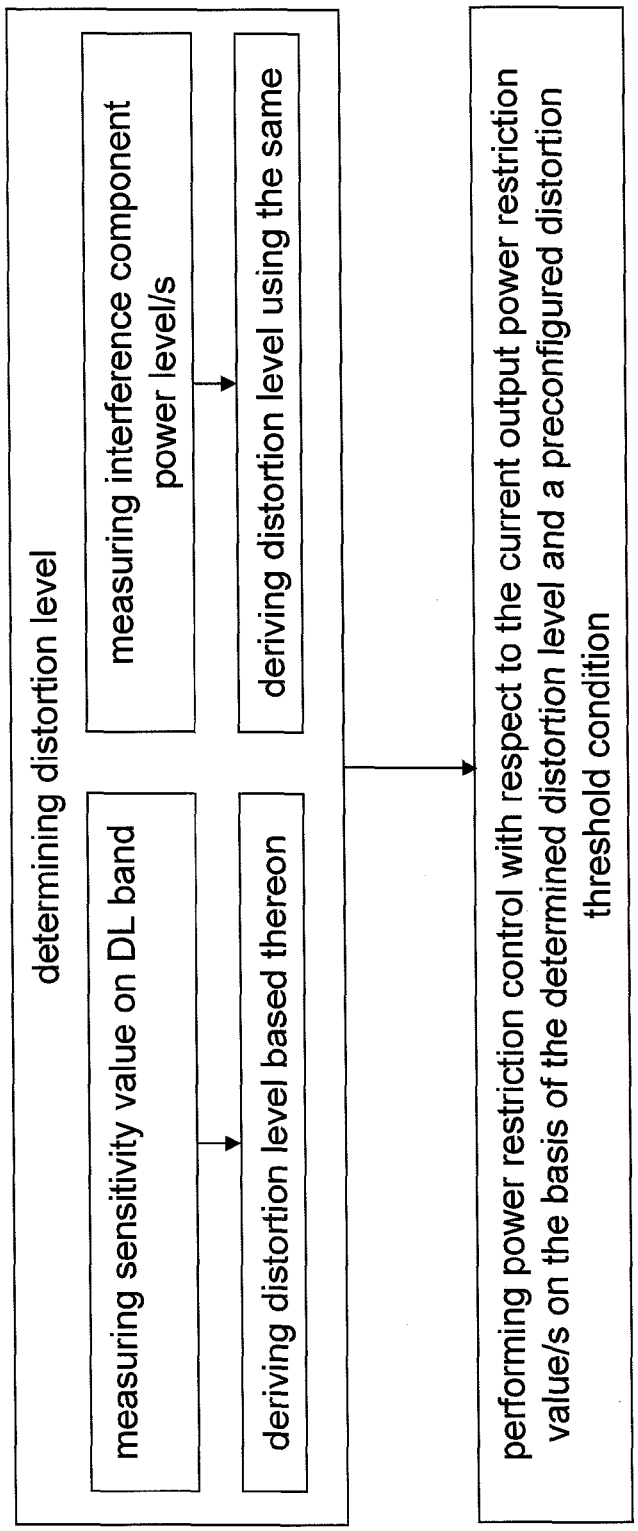
FIG. 4 shows a flowchart of a third variant of an exemplary method according to exemplary embodiments of the present invention.

FIG. 4 shows a flowchart of a third variant of an exemplary method according to exemplary embodiments of the present invention.

The method according to FIG. 4 represents a variation of the method according to FIG. 2, in which various exemplary details of the determination operation are given, which are inherently independent from each other as such. The method according to FIG. 4 may also be combined with the method according to FIG. 3.

According to FIG. 4, an exemplary determination operation according to exemplary embodiments of the present invention may comprise an operation of measuring a sensitivity value on the downlink band, and an operation of deriving the distortion level on the basis of the measured sensitivity value and a standard sensitivity value of the downlink band. For example, the distortion level may be derived as a difference between the standard sensitivity value and the measured sensitivity value, thus representing distortion-caused desensitization on the downlink band, i.e. a victim receiver interference scenario.

The sensitivity of the victim band may be measured at least by using standard RX measurements (i.e. standard operational receivers) on the victim band or using measurement RX (i.e. dedicated measurement receivers operable on the downlink band) if it has enough performance. Anyway, the victim band may be active during such measurement, i.e. the measurement may be performed during a receiving operation on the victim DL band.

According to FIG. 4, additionally or alternatively to the above, an exemplary determination operation according to exemplary embodiments of the present invention may comprise an operation of measuring a power level of at least one interference component affecting distortion on the downlink band, and an operation of deriving the distortion level using the at least one measured power level on the basis of at least one of a computation and a table look up representing a power level function. Namely, the distortion level may be derived as a result of a power level function of power levels which are components for interference on the victim band. Also, antenna isolations may be taken into account when defining distortion levels (with one or more of the aforementioned parameters being applicable in this regard).

The interference component power level/s may be measured and used as an input to computation or look up of the distortion-caused desensitization on the downlink band, i.e. a victim receiver interference scenario.

According to exemplary embodiments of the present invention, the at least one interference component comprises one or more of a fundamental power, a fundamental channel leakage power (e.g. ACLR power), a harmonic power and a harmonic channel leakage power (e.g. harmonic ACLR power) of the at least one uplink band of the terminal device.

According to exemplary embodiments of the present invention, the power restriction control operation may be based on any one or both of the distortion levels derived as outlined above. That is to say, the power restriction control operation according to exemplary embodiments of the present invention may control the output power restriction value according at least one distortion level based on sensitivity measurements of the victim band (with one or more receivers) and/or at least one distortion level based on interference component power level measurements.

Figure 5:
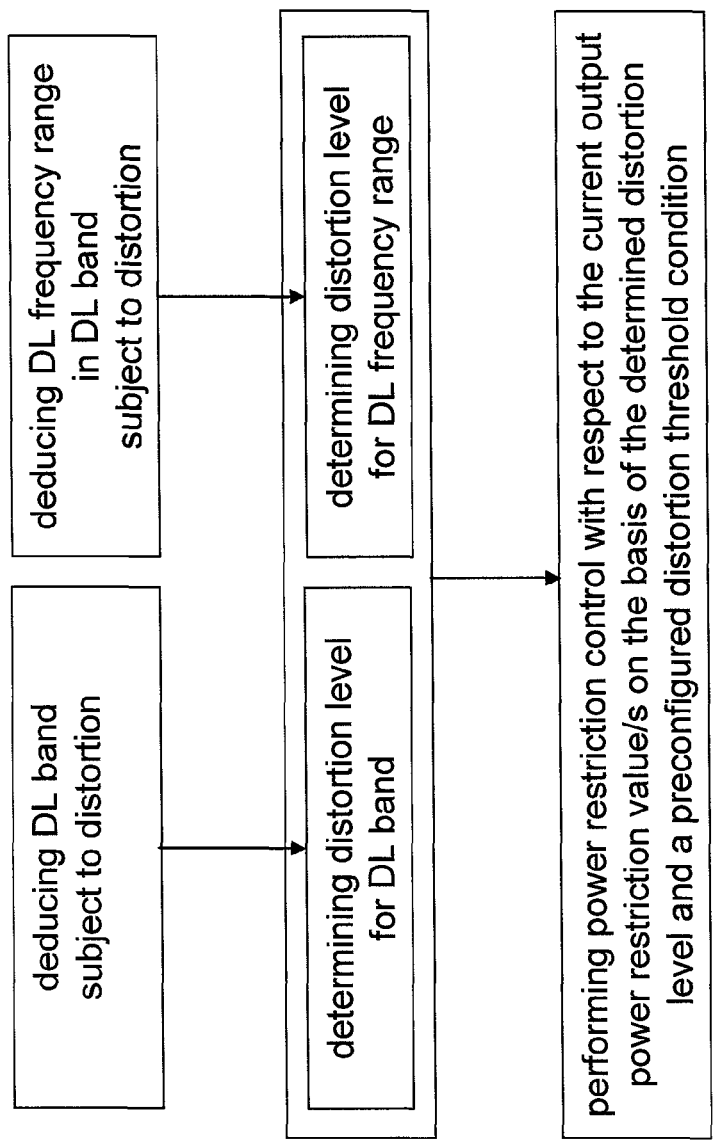
FIG. 5 shows a flowchart of a fourth variant of an exemplary method according to exemplary embodiments of the present invention.

FIG. 5 shows a flowchart of a fourth variant of an exemplary method according to exemplary embodiments of the present invention.

The method according to FIG. 5 represents a variation of the method according to FIG. 2, in which exemplary additional operations and corresponding exemplary details of the determination operation are given, which are inherently independent from each other as such. The method according to FIG. 5 may also be combined with any one of the methods according to FIGS. 3 and 4, respectively.

According to FIG. 5, an exemplary method according to exemplary embodiments of the present invention may comprise an operation of deducing the downlink band subject to distortion, i.e. the victim band, on the basis of one or more of frequency relations between uplink and downlink bands, antenna operational conditions and antenna isolations of the terminal device. In such case, the distortion level is determined for the deduced downlink band (e.g. an entire DL band or part thereof).

Additionally or alternatively, an exemplary method according to exemplary embodiments of the present invention may comprise an operation of deducing a currently assigned downlink frequency range in the downlink band, i.e. the victim band, subject to distortion on the basis of one or more of frequency relations between uplink and downlink bands, antenna operational conditions and antenna isolations of the terminal device. Stated in other words, it may be deduced whether a currently assigned downlink frequency range faces harmonic and/or intermodulation distortion, i.e. whether there is a victim frequency range within the victim DL band. In such case, the distortion level is determined for the deduced downlink frequency range (as a part of the victim downlink band).

According to exemplary embodiments of the present invention, any one or both of the aforementioned deductions of the relevant DL space may be using e.g. frequency relations between bands (relating to harmonic, IMD2, IMD3, etc.) by various ways. For example, such deduction may be derivable by a computing algorithm (e.g. in a modem or application software) or by using some (e.g. network-signaled) indicator or information on the victim band in certain band combinations (which can be coded e.g. in UE memory).

The relevant DL space according to exemplary embodiments of the present invention, i.e. the victim DL band as such or a partial frequency range thereof, may depend on a specific use case in which the method is applied (as outlined above).

Figure 6:
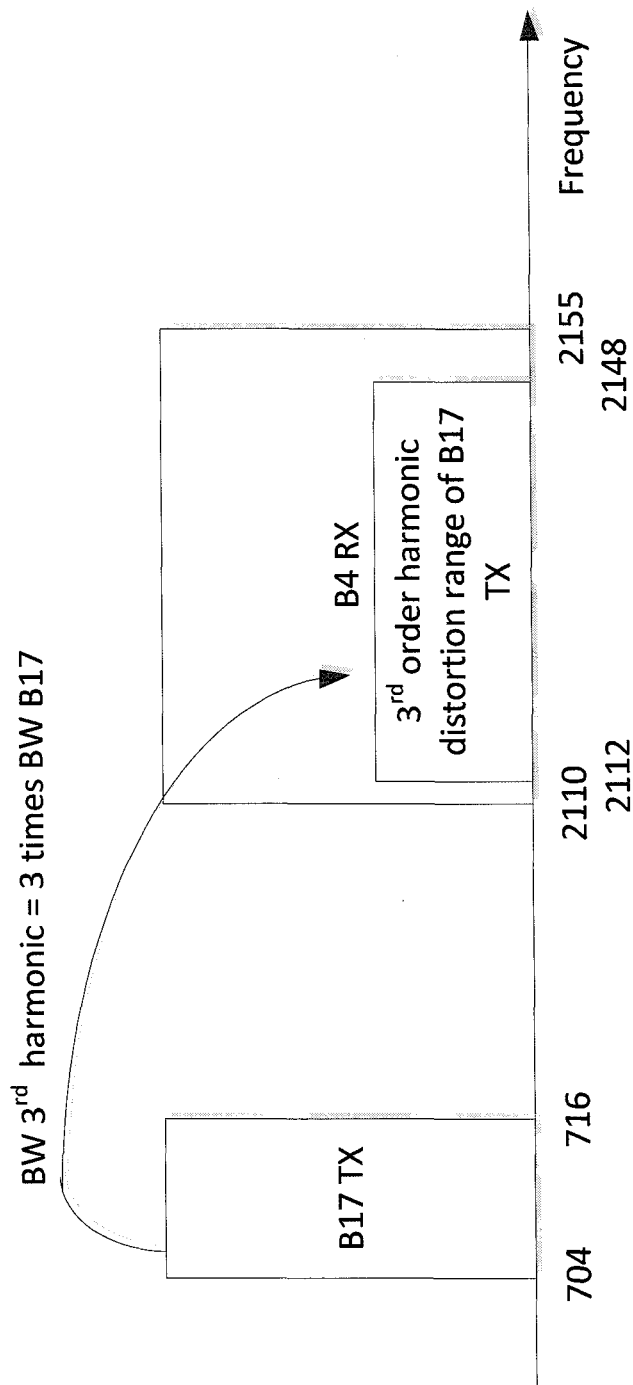
FIG. 6 shows a diagram of an example of third order harmonic distortion on a downlink band, for which exemplary embodiments of the present invention are applicable.

FIG. 6 shows a diagram of an example of third order harmonic distortion (without ACLR characteristics) on a downlink band, for which exemplary embodiments of the present invention are applicable. In this regard, the difference in relevant DL space is described with respect to different use cases.

In a testing phase of the terminal device or its platform (i.e. in reference platform testing or UE testing), the determination and power restriction control operations may be performed, i.e. an appropriate output power restriction value may be evaluated, for a victim band (e.g. an entire DL band or part thereof). In the example of FIG. 6, such victim band corresponds to the DL's confined frequency range 2112 . . . 2148 MHz. This is because the resulting output power restriction value must also hold in a worst case.

In an operational phase of the terminal device (i.e. in the field), the determination and power restriction control operations may be performed, i.e. an appropriate output power restriction value may be evaluated, for an assigned victim frequency range. It is noted that the assigned DL frequency range depends on bandwidth configuration, e.g. on LTE bandwidth (1.4, 3, 5, 10, 15, 20, etc.). In the example of FIG. 6, such victim frequency range may correspond to the DL's confined frequency 2150 . . . 2155 (assuming a 5 MHz DL bandwidth). In this case, in view of the presently assumed third order harmonic distortion from B17, the UE could use a smaller output power restriction value compared to e.g. a case when the DL is assigned at 2130 . . . 2135.

In view of the above, exemplary embodiments of the present invention provide for a power restriction control for inter-band multi-carrier capable devices, which is effective in terms of a tradeoff between distortion or desensitization and device coverage, e.g. in the context of inter-band carrier aggregation. Accordingly, a highest possible output power (due to a smallest possible output power restriction value) may be achieved so as to enhance the device coverage, while still meeting desensitization requirements.

Further, such power restriction control according to the aforementioned exemplary aspects of the present invention is flexible, dynamic and device-specific, and it may thus compensate e.g. for device implementation dependent variations or the like.

Generally, it is to be noted that the above examples commonly assume a combination of two uplinks or two uplink carriers, respectively. Such assumption is made only by way of example in an effort to simplify explanation of the principles of the present invention and its embodiments. Irrespective thereof, any number of uplinks or uplink carriers could be combined and corresponding output power restriction values could equally be calculated, signaled and applied as well. That is to say, exemplary embodiments of the present invention are not limited to a specific number of uplinks or uplink carriers to be combined.

Further, it is noted that the above examples mainly relate to second and third order intermodulation or harmonics. Such relation is made only by way of example in an effort to simplify explanation of the principles of the present invention and its embodiments. Irrespective thereof, any kind, type, source, modulation and order of intermodulation or harmonics or harmonic ACLR could be equally considered as well. That is to say, exemplary embodiments of the present invention are not limited to a specific order intermodulation or harmonics (i.e. an intermodulation distortion or harmonics distortion of a specific order) to be considered.

Still further, it is noted that a single victim band is herein assumed as a basis for determination and power restriction control operations. This is only assumed by way of example in an effort to simplify explanation of the principles of the present invention and its embodiments. Irrespective thereof, the same principles equally apply when two or more victim bands of a terminal device are (intended) to be evaluated accordingly.

Yet still further, it is noted that inter-band multi-carrier capable devices are herein assumed to consistently operate in a carrier combination/aggregation transmission mode. While such devices are typically also operable in a single carrier transmission mode, such transmission mode and/or a switching between such transmission modes is not a relevant aspect of the present specification.

Still further, it is noted that the above examples are mainly described with respect to intermodulation distortion and harmonic distortion. Yet, it is to be noted that the principles of the present invention are equally applicable to any other distortion/interference sources as well. According to exemplary embodiments of the present invention, at least one distortion/interference component may comprise one or more of an intermodulation power, a harmonic power, a fundamental power, a fundamental channel leakage power (e.g. ACLR power), and a harmonic channel leakage power (e.g. harmonic fundamental ACLR power) of the at least one uplink band of the terminal device. Stated in other words, the source of distortion/interference is not relevant for the applicability of exemplary embodiments of the present invention.

Generally, the above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software, algorithms, and/or hardware thereof.

Respective exemplary embodiments of the present invention are described below referring to FIGS. 7 and 8, while for the sake of brevity reference is made to the detailed description with regard to FIGS. 1 to 6.

Figure 7:
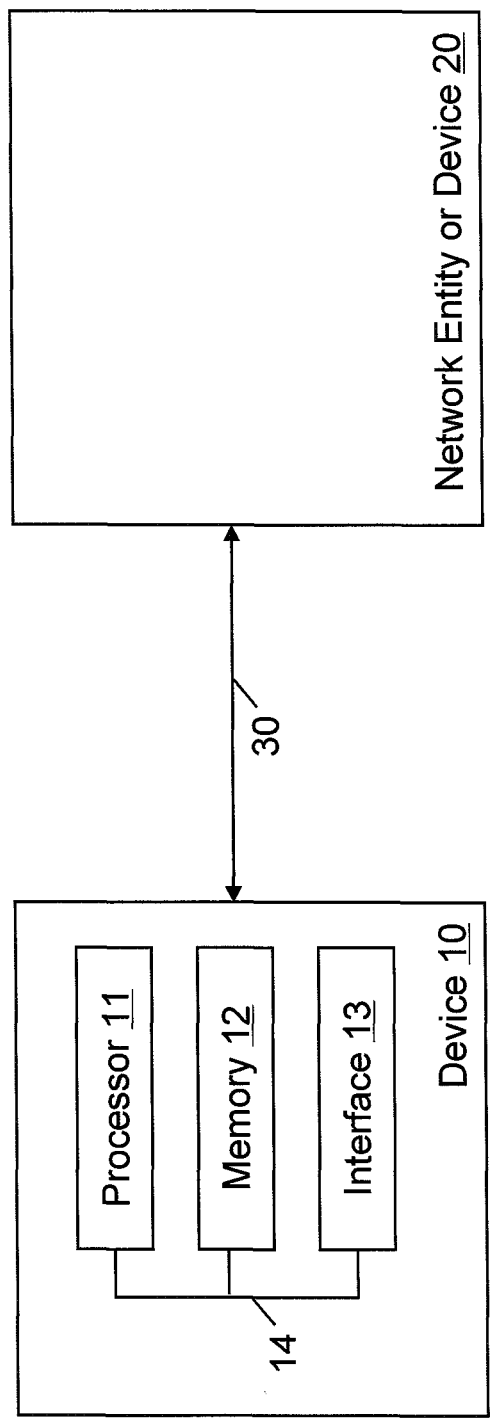
FIG. 7 shows a schematic block diagram illustrating exemplary apparatuses according to exemplary embodiments of the present invention.

In FIG. 7 below, which is noted to represent a simplified block diagram, the solid line blocks are basically configured to perform respective operations as described above. The entirety of solid line blocks are basically configured to perform the methods and operations as described above, respectively. With respect to FIG. 7, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 7, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

Figure 8:
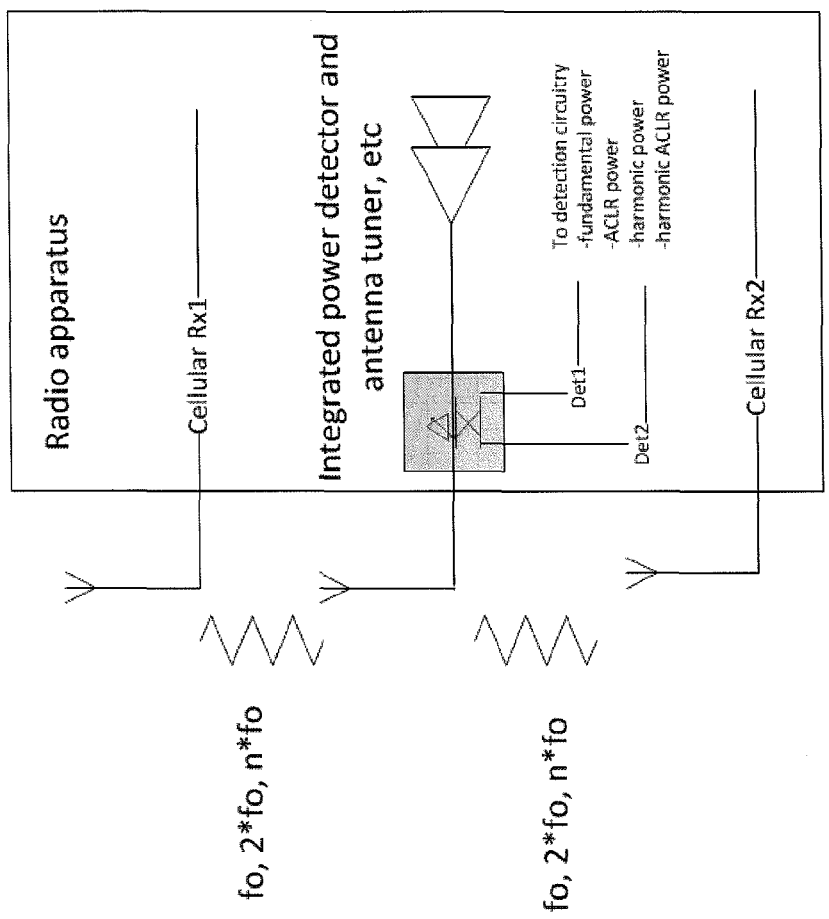
FIG. 8 shows a schematic block diagram illustrating an exemplary apparatus according to exemplary embodiments of the present invention.

Similar notions also apply for FIG. 8 accordingly.

FIG. 7 shows a schematic block diagram illustrating exemplary apparatuses according to exemplary embodiments of the present invention.

In view of the above, the thus described apparatuses 10 and 20 are suitable for use in practicing the exemplary embodiments of the present invention, as described herein.

The thus described apparatus 10 may represent a (part of a) device or terminal such as a mobile station MS or user equipment UE or a modem (which may be installed as part of a MS or UE, but may be also a separate module, which can be attached to various devices), and may be configured to perform a procedure and/or functionality as described in conjunction with any one of FIGS. 2 to 6. The thus described apparatus 20 may represent a (part of a) network entity, such as a base station or access node or any network-based controller, e.g. an eNB, and may be configured to perform a procedure and/or functionality as indicated above, while no further details thereof are given.

Alternatively, the thus described apparatus 20 may represent a second device or terminal such as a mobile station MS or user equipment UE or a modem (which may be installed as part of a MS or UE, but may be also a separate module, which can be attached to various devices), and may be configured to perform a procedure and/or functionality as described in conjunction with any one of FIGS. 2 to 6. Stated in other words, exemplary embodiments of the present invention are equally applicable to device-to-device (D2) communication scenarios, i.e. communication scenarios between two or more terminal devices, in which a network infrastructure is not (directly) involved.

As indicated in FIG. 7, according to exemplary embodiments of the present invention, the apparatus 10 comprises a processor 11, a memory 12 and an interface 13, which are connected by a bus 14 or the like, and the apparatuses may be connected via link 30, respectively.

The processor 11 and/or the interface 13 may also include a modem or the like to facilitate communication over a (hardwire or wireless) link, respectively. The interface 13 may include a suitable transceiver coupled to one or more antennas or communication means for (hardwire or wireless) communications with the linked or connected device(s), respectively. The interface 13 is generally configured to communicate with at least one other apparatus, i.e. the interface thereof.

The memory 12 may store respective programs assumed to include program instructions or computer program code that, when executed by the respective processor, enables the respective electronic device or apparatus to operate in accordance with the exemplary embodiments of the present invention. For example, the memory 12 may store a computation algorithm, a look up table, preconfigured values, or the like, as mentioned above.

In general terms, the respective devices/apparatuses (and/or parts thereof) may represent means for performing respective operations and/or exhibiting respective functionalities, and/or the respective devices (and/or parts thereof) may have functions for performing respective operations and/or exhibit respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the terminal 10 comprises at least one processor 11, at least one memory 12 including computer program code, and at least one interface 13 configured for communication with at least another apparatus. The processor (i.e. the at least one processor 11, with the at least one memory 12 and the computer program code) is configured to perform determining a distortion level on a downlink band of a terminal device when using at least one output power restriction value for output power for at least one uplink band of the terminal device, and performing power restriction control with respect to the at least one output power restriction value on the basis of the determined distortion level and a preconfigured distortion threshold condition.

In its most basic form, stated in other words, the apparatus 10 may thus comprise respective means for determining and means for performing power restriction control.

As outlined above, the apparatus 10 may comprise one or more of respective means for comparing, means for controlling, means for tuning, means for signaling, means for looping back, means for measuring, and means for deducing.

FIG. 8 shows a schematic block diagram illustrating an exemplary apparatus according to exemplary embodiments of the present invention.

It is noted that the different structures according to FIGS. 7 and 8 merely represent different illustrations and do not exclude each other. Rather, the different structures according to FIGS. 7 and 8 are compatible with each other. For example, the detection circuitry according to FIG. 8 may correspond to or compatible with the processor (in connection with the memory) according to FIG. 7, and the various antennas according to FIG. 8 may correspond to or compatible with the interface according to FIG. 7.

According to FIG. 8, it is assumed that an apparatus has two receivers operable on cellular DL bands, and a transmitter. As indicated, it is assumed that distortion (e.g. in the form of harmonics of different order) from the transmitter is caused at the receivers. With reference to the exemplary method according to FIG. 4, it is assumed that the distortion level for the respective DL bands of the two receivers is derivable on the basis of power levels of interference components thereof. Such power levels of interference components are measured at/by the detection circuitry arranged at the transmitter path. On the basis of such detection (measurement) results, the respective distortion levels may then be derived accordingly, and the power restriction control may be performed on the basis thereof.

For further details regarding the operability/functionality of the individual apparatuses, in particular the power restriction control, reference is made to the above description in connection with any one of FIGS. 1 to 6, respectively.

According to exemplarily embodiments of the present invention, a system may comprise any conceivable combination of the thus depicted devices/apparatuses and other network elements, which are configured to cooperate with any one of them.

In general, it is to be noted that respective functional blocks or elements according to above-described aspects can be implemented by any known means, either in hardware and/or software/firmware, respectively, if it is only adapted to perform the described functions of the respective parts. The mentioned method steps can be realized in individual functional blocks or by individual devices, or one or more of the method steps can be realized in a single functional block or by a single device.

Generally, any structural means such as a processor or other circuitry may refer to one or more of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. Also, it may also cover an implementation of merely a processor (or multiple processors) or portion of a processor and its (or their) accompanying software and/or firmware, any integrated circuit, or the like.

Generally, any procedural step or functionality is suitable to be implemented as software/firmware or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and/or exemplary embodiments thereof provide measures for enabling power restriction control for inter-band multi-carrier capable devices, such as e.g. inter-band carrier aggregation capable devices. Such measures may exemplarily comprise a distortion level determination on a downlink band of a terminal device when using at least one output power restriction value for output power for at least one uplink band of the terminal device, and a power restriction control with respect to the at least one output power restriction value on the basis of the determined distortion level and a preconfigured distortion threshold condition.

The measures according to exemplary embodiments of the present invention may be applied for any kind of network environment, such as for example for communication systems in accordance with 3GPP RAN1/RAN2/RAN3/RAN4 standards, i.e. LTE standards of release 10/11/12/ . . . (including LTE-Advanced and its evolutions) and/or UMTS standards and/or WCDMA standards and/or HSPA standards. In particular, the measures according to exemplary embodiments of the present invention may be applied to inter-band carrier aggregation which is a feature e.g. of 3GPP LTE standards of release 10/11/12 and onwards.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
ACLR Adjacent Channel Leakage Ratio
A-MPR Additional Maximum Power Reduction
CA Carrier Aggregation
CC Component Carrier
CQI Channel Quality Indicator DL Downlink
eNB evolved Node B (E-UTRAN base station)
E-UTRAN Evolved UTRAN
HSPA High Speed Packet Access
IM Intermodulation
IMD Intermodulation distortion
ISM band Industrial, Scientific and Medical band
LTE Long Term Evolution
LTE-A Long Term Evolution Advanced
NS Network Signaling
PSD Power Spectral Density
RAT Radio Access Technology
RB Resource Block
SRS Sounding Reference Signal
TX Transmitter/Transmission
UE User Equipment
UL Uplink
UMTS Universal Mobile Telecommunications System
UTRAN Universal Terrestrial Radio Access Network
WCDMA Wideband Code Division Multiple Access
WLAN Wireless Local Area Network

What is claimed is:

1. A method for controlling a terminal device comprising:
determining a distortion level on a downlink band of the terminal device when using at least one output power restriction value for output power for at least one uplink band of the terminal device, and
performing power restriction control with respect to the at least one output power restriction value on the basis of the determined distortion level and a preconfigured distortion threshold condition,
wherein the power restriction control comprises:
comparing the determined distortion level with the preconfigured distortion threshold condition, and
controlling the at least one output power restriction value based on the comparison result, said controlling comprising:
decreasing the at least one output power restriction value by a specified or adjustable decrease amount, when the determined distortion level is below the preconfigured distortion threshold condition, or
increasing the at least one output power restriction value by a specified or adjustable decrease amount or to a previously valid output power restriction value, when the determined distortion level is above the preconfigured distortion threshold condition, or
maintaining the at least one output power restriction value, when the determined distortion level meets the preconfigured distortion threshold condition.

2. The method according to claim 1, wherein
the preconfigured distortion threshold condition comprises one of a device-specific distortion threshold condition and a standard distortion threshold condition, and/or
the preconfigured distortion threshold condition comprises one of a distortion threshold level defined by a single distortion threshold value and a distortion threshold range defined by a tolerance range at a single distortion threshold value or a pair of upper and lower distortion threshold values.

3. The method according to claim 1, further comprising
tuning the output power for the at least one uplink band of the terminal device according to the at least one output power restriction value and/or signaling an indication of an appropriateness of the at least one output power restriction value towards a network and/or another terminal device, when the at least one output power restriction value is controlled to be maintained, and/or
looping back to the determining using the at least one output power restriction value, when the at least one output power restriction value is controlled to be decreased or increased.

4. The method according to claim 1, wherein the determining comprises
measuring a sensitivity value on the downlink band, and deriving the distortion level on the basis of the measured sensitivity value and a standard sensitivity value of the downlink band, and/or
measuring a power level of at least one interference component affecting distortion on the downlink band, and deriving the distortion level using the at least one measured power level on the basis of at least one of a computation and a table look up representing a power level function.

5. The method according to claim 4, wherein
the sensitivity is measured using a measurement of one or more standard operational receivers and/or dedicated measurement receivers operable on the downlink band, and/or
the at least one interference component comprises one or more of a fundamental power, a fundamental channel leakage power, a harmonic power and a harmonic channel leakage power of the at least one uplink band of the terminal device.

6. The method according to claim 1, further comprising
deducing the downlink band subject to distortion on the basis of one or more of frequency relations between uplink and downlink bands, antenna operational conditions and antenna isolations of the terminal device, and/or
deducing a currently assigned downlink frequency range in the downlink band subject to distortion on the basis of one or more of frequency relations between uplink and downlink bands, antenna operational conditions and antenna isolations of the terminal device, wherein the distortion level is determined for the deduced downlink frequency range.

7. The method according claim 1, wherein
the method is executed in a testing phase of the terminal device or its platform, wherein
an initial value of the at least one output power restriction value is based on an initial guess, and/or
the distortion level is determined and the power restriction control is performed for a plurality of uplink-downlink band allocations of the terminal device, and a smallest one of resulting output power restriction values for the plurality of uplink-downlink band allocations of the terminal device is adopted as a result of the power restriction control, and/or
the method is operable in an operation phase of the terminal device, wherein
an initial value of the at least one output power restriction value is based on a network signaling or a pre-configuration, and/or
the distortion level is determined and the power restriction control is performed for a currently assigned uplink-downlink band allocation of the terminal device.

8. The method according to claim 1, wherein
the method is executed by a terminal, user equipment, mobile station or modem, and/or
the method is executed in at least one of a LTE and a LTE-A cellular system, and/or
the at least one output power restriction value comprises at least one band-specific output power restriction value for an output power for one uplink band of the terminal device and/or at least one combination-specific output power restriction value for a cumulative output power for a combination of at least two uplink bands of the terminal device, and/or the distortion comprises at least one of an intermodulation distortion from at least two uplink bands of the terminal device and a harmonic distortion from at least one uplink band of the terminal device, and/or a combination of at least two uplink bands of the terminal device constitutes an inter-band carrier aggregation.

9. An apparatus comprising:
at least one processor,
at least one memory including computer program code, and
at least one interface configured for communication with at least another apparatus,
the at least one processor, with the at least one memory and the computer program code, being configured to cause the apparatus to perform:
determining a distortion level on a downlink band of a terminal device when using at least one output power restriction value for output power for at least one uplink band of the terminal device, and
performing power restriction control with respect to the at least one output power restriction value on the basis of the determined distortion level and a preconfigured distortion threshold condition,
wherein the power restriction control comprises:
comparing the determined distortion level with the preconfigured distortion threshold condition, and
controlling the at least one output power restriction value based on the comparison result, said controlling comprising:
decreasing the at least one output power restriction value by a specified or adjustable decrease amount, when the determine distortion level is below the preconfigured distortion threshold condition, or
increasing the at least one output power restriction value by a specified or adjustable decrease amount or to a previously valid output power restriction value, when the determined distortion level is above the preconfigured distortion threshold condition, or
maintaining the at least one output power restriction value, when the determined distortion level meets the preconfigured distortion threshold condition.

10. The apparatus according to claim 9, wherein
the preconfigured distortion threshold condition comprises one of a device-specific distortion threshold condition and a standard distortion threshold condition, and/or
the preconfigured distortion threshold condition comprises one of a distortion threshold level defined by a single distortion threshold value and a distortion threshold range defined by a tolerance range at a single distortion threshold value or a pair of upper and lower distortion threshold values.

11. The apparatus according to claim 9, wherein the at least one processor, with the at least one memory and the computer program code, being configured to cause the apparatus to perform:
tuning the output power for the at least one uplink band of the terminal device according to the at least one output power restriction value and/or signaling an indication of an appropriateness of the at least one output power restriction value towards a network and/or another terminal device, when the at least one output power restriction value is controlled to be maintained, and/or looping back to the determining using the at least one output power restriction value, when the at least one output power restriction value is controlled to be decreased or increased.

12. The apparatus according to claim 9, wherein the at least one processor, with the at least one memory and the computer program code, being configured to cause the apparatus to perform:
measuring a sensitivity value on the downlink band, and deriving the distortion level on the basis of the measured sensitivity value and a standard sensitivity value of the downlink band, and/or
measuring a power level of at least one interference component affecting distortion on the downlink band, and deriving the distortion level using the at least one measured power level on the basis of at least one of a computation and a table look up representing a power level function.

13. The apparatus according to claim 12, wherein
the at least one processor, with the at least one memory and the computer program code, being configured to cause the apparatus to measure the sensitivity using a measurement of one or more standard operational receivers and/or dedicated measurement receivers operable on the downlink band, and/or
the at least one interference component comprises one or more of a fundamental power, a fundamental channel leakage power, a harmonic power and a harmonic channel leakage power of the at least one uplink band of the terminal device.

14. The apparatus according to claim 9, wherein the at least one processor, with the at least one memory and the computer program code, being configured to cause the apparatus to perform:
deducing the downlink band subject to distortion on the basis of one or more of frequency relations between uplink and downlink bands, antenna operational conditions and antenna isolations of the terminal device, and/or
deducing a currently assigned downlink frequency range in the downlink band subject to distortion on the basis of one or more of frequency relations between uplink and downlink bands, antenna operational conditions and antenna isolations of the terminal device, wherein the at least one processor, with the at least one memory and the computer program code, being configured to cause the apparatus to determine the distortion level for the deduced downlink frequency range.

15. The apparatus according to claim 9, wherein
the apparatus is operable in a testing phase of the terminal device or its platform, wherein
an initial value of the at least one output power restriction value is based on an initial guess, and/or
the at least one processor, with the at least one memory and the computer program code, being configured to cause the apparatus determine the distortion level and to perform the power restriction control for a plurality of uplink-downlink band allocation of the terminal device, and to adopt a smallest one of resulting output power restriction values for the plurality of uplink-downlink band allocations of the terminal device as a result of the power restriction control, and/or
the apparatus is operable in an operation phase of the terminal device, wherein
an initial value of the at least one output power restriction value is based on a network signaling or a pre-configuration, and/or the at least one processor, with the at least one memory and the computer program code, being configured to cause the apparatus to determine the distortion level and to perform the power restriction control a currently assigned uplink-downlink band allocation of the terminal device.

16. The apparatus according to claim 9, wherein
the apparatus is operable as or at a terminal, user equipment, mobile station or modem, and/or
the apparatus is operable in at least one of a LTE and a LTE-A cellular system, and/or
the at least one output power restriction value comprises at least one band-specific output power restriction value for an output power for one uplink band of the terminal device and/or at least one combination-specific output power restriction value for a cumulative output power for a combination of at least two uplink bands of the terminal device, and/or
the distortion comprises at least one of an intermodulation distortion from at least two uplink bands of the terminal device and a harmonic distortion from at least one uplink band of the terminal device, and/or
a combination of at least two uplink bands of the terminal device constitutes an inter-band carrier aggregation.

17. A non-transitory computer readable memory comprising a set of instructions which, when executed on an apparatus, is configured to cause the apparatus to:

determine a distortion level on a downlink band of a terminal device when using at least one output power restriction value for output power for at least one uplink band of the terminal device, and
perform power restriction control with respect to the at least one output power restriction value on the basis of the determined distortion level and a preconfigured distortion threshold condition,
wherein the power restriction control comprises:
comparing the determined distortion level with the preconfigured distortion threshold condition, and
controlling the at least one output power restriction value based on the comparison result, said controlling comprising:
decreasing the at least one output power restriction value by a specified or adjustable decrease amount, when the determined distortion level is below the preconfigured distortion threshold condition, or
increasing the at least one output power restriction value by a specified or adjustable decrease amount or to a previously valid output power restriction value, when the determined distortion level is above the preconfigured distortion threshold condition, or
maintaining the at least one output power restriction value, when the determined distortion level meets the preconfigured distortion threshold condition.

* * * * *

UNITED STATES PATENT AND TRADEMARK OFFICE
CERTIFICATE OF CORRECTION

PATENT NO. : 8,611,888 B2  
APPLICATION NO. : 13/372574  
DATED : December 17, 2013  
INVENTOR(S) : Antti Oskari Immonen, Seppo Rousu and Jouni Kristian Kaukovuori Page 1 of 1

It is certified that error appears in the above-identified patent and that said Letters Patent is hereby corrected as shown below:

In the Claims:

Col. 19, Claim 9 line 37; the word "determine" should read --determined--.

Col. 20, Claim 15 line 58; the word "allocation" should read --allocations--.

Signed and Sealed this
Twenty-fifth Day of February, 2014

Michelle K. Lee
*Deputy Director of the United States Patent and Trademark Office*